Sept. 23, 1952 W. E. BRANDAU 2,611,791
THERMOCOUPLE MEANS
Filed Feb. 9, 1950

INVENTOR.
WILLIAM E. BRANDAU
BY Michael J. Borselle
ATTORNEY

Patented Sept. 23, 1952

2,611,791

UNITED STATES PATENT OFFICE 2,611,791

THERMOCOUPLE MEANS

William E. Brandau, Westwood, N. J., assignor to Bendix Aviation Corporation, Teterboro, N. J., a corporation of Delaware Application February 9, 1950, Serial No. 143,225

5 Claims. (Cl. 136—4)

1

The present invention relates to temperature measuring means and more particularly to a thermocouple for the temperature measurement of high temperature gases.

The invention is particularly adapted to that type of application wherein it is desired to measure the temperature of the exhaust gases in a jet engine, or the temperatures about the tail pipe area of a jet engine powered craft.

Similar devices of the prior art have been employed to measure the temperature of a gas, but these generally have been subject to certain structural disadvantages which reduce their durability and utility such as, for example, the disintegration of the ceramic body of the thermocouple through repeated vibrational contact of the structure supporting the sensitive element with the external housing, or because of the differential expansion under high temperature conditions between the ceramic material and the thermocouple wires. The failure heretofore to solve the herein disclosed problems has resulted in premature destruction due to wear of the thermocouple components, unreliable operation as a result thereof, and an increase in maintenance and replacement costs.

It is, therefore, one of the objects of the present invention to provide a thermocouple for the measurement of relatively high temperature gases wherein the foregoing problems are eliminated and to do so in a novel and effective manner.

Another object of the invention is to provide a thermocouple for the measurement of relatively high temperature gases wherein the external housing is eliminated.

Still another object of the invention is to provide a thermocouple of the above indicated nature wherein the sensitive element is free from vibrational contact with the supporting structure.

A further object of the invention is to provide a thermocouple, for the measurement of the temperature of gases, which will be effectively applicable for the temperature measurement of jet engine combustion and exhaust gases.

Still another object of the invention is to provide thermocouple means of the above indicated nature which will be more durable and yet more economical than similar means heretofore.

Another object of the invention is to provide a thermocouple for the measurement of the temperature of gases which will be simple and easy to manufacture, yet positive and reliable in operation.

2

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing is for the purpose of illustration only and is not to be construed as defining the limits of the invention.

Referring to the drawing wherein like reference characters designate like parts.

Figure 1:
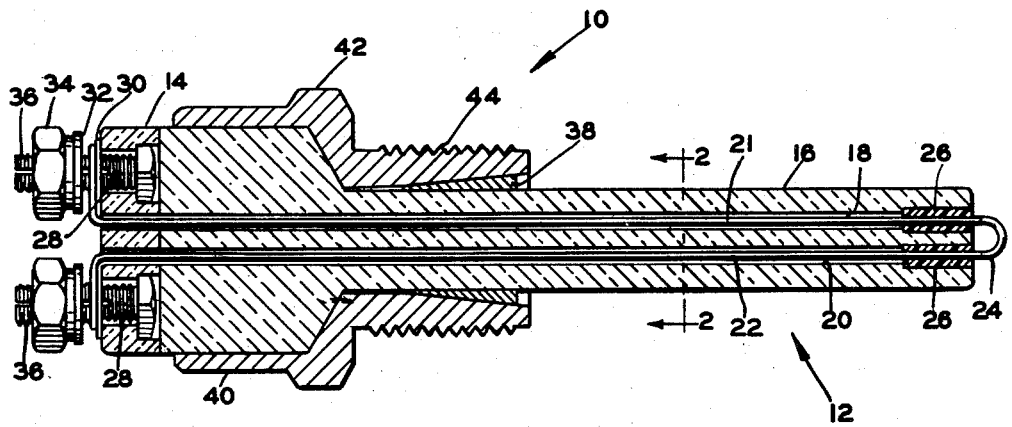
Figure 1 is a horizontal section of the thermocouple.
Figure 2:
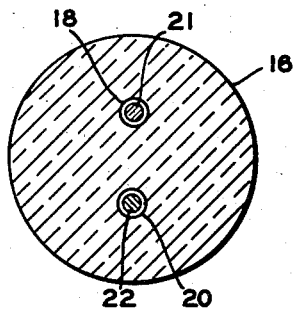
Figure 2 is a section taken along the line 2—2 of Figure 1.
Figure 3:
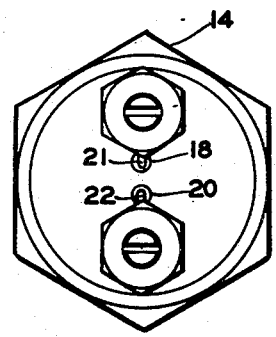
Figure 3 is an end view of Figure 1.

Referring now to the drawing and more particularly to Figure 1, a thermocouple assembly 10 comprises a substantially elongated annular ceramic body 12 which includes a top portion 14 and a probe portion of smaller diameter 16, a pair of through holes 18 and 20 (Figures 1 and 2) extend the length of the ceramic body 12 and contain the thermocouple wires 21 and 22. The wires 21 and 22 are dissimilar conductors made of suitable alloys commonly employed in the art such as gold-palladium and platinum-rhodium and are of relatively smaller diameter than the holes 18 and 20. The conductors 21 and 22 are jointed by a fusible wire 24 at the base of the probe portion 16.

A non-conducting annular insert 26 supports each wire 21 and 22 at the base of the probe portion 16. The inserts 26 are made of a gummy pliable substance suitable to absorb the vibration loads of the wires 21 and 22.

The opposite ends of the wires 21 and 22 emerge from the top portion 14 and connect about an insert stud 28 embedded in the ceramic top portion 14. A washer 30 and a lock washer 32 under pressure of the nut 34 hold the thermocouple wires 21 and 22 firmly to the stud 28. The ends of the studs 28 contain suitable electrical terminals 36 so that the thermocouple 10 may be connected into an electrical circuit.

An annular wedge sectioned seal 38 concentric about the ceramic body 12 rests beneath a collar 40 and secures the collar firmly to the ceramic body 12. The collar 40 comprises a hexagonal nut section 42 and a threaded section 44.

Having thus described the invention in operation, it will readily be apparent to those skilled in the art that when the probe portion 16 of the thermocouple 10 is threaded by means of threads 44 into a combustion chamber or an engine well and secured firmly in place by means of the hexagonal section 42, the thermocouple will be subject to the vibration of the structure to which it is secured.

Since no external housing encompasses the ceramic body 12, there will be no wear of ceramic due to vibration against the metallic housing. Similarly since the holes 18 and 20 are of larger diameter than the wires 21 and 22 there will be no vibrational contact between the wires and the inner portion of the ceramic body 12.

In this manner the problem of unequal expansion of dissimilar materials in close structural contact is circumvented since there is no housing exteriorly about the ceramic, and since the thermocouple wires 21 and 22 are free to expand lengthwise through the holes 18 and 20. The gummy resinous supports 26 serve to hold the wires 20 and 21 clear of the ceramic and, also absorb and dampen the vibration of the wires.

The inserts 26 may be made of various suitable materials, such as the aforementioned pliable substance, for example, a lead oxide and Pyrex glass compound.

Metallic inserts integrally cast with the ceramic may likewise be used to locally clamp the thermocouple wires in place, or one of many high temperature cements common in the art such as sauerreisen, may be used as insert material.

There are thus provided temperature measuring means for high temperature gases or the like wherein the problems of vibration and loosening of the ceramic material are substantially eliminated.

Although only one embodiment of the invention has been illustrated and described, other changes and modifications in the form and relative arrangement of the parts may be made without departing from the spirit and the scope of the invention.

What is claimed is:

1. A probe for measuring the temperature of gases comprising, in combination, an elongated annular ceramic section including an end portion of larger diameter, a pair of through longitudinal holes in said section, a dissimilar conductor through each hole, said conductors having a diameter less than said holes and interfused at one end of said section, a resinous insert in each hole adjacent the base of said section, said inserts supporting said conductors away from the walls of said holes, a pair of terminal inserts in said end portion, said conductors secured to said inserts, a collar about one end of said section and an annular wedge securing said collar to said section, said collar threaded for installing said probe.

2. A probe for measuring the temperature of high temperature gases comprising, in combination, a corrosion resistant elongated section having a portion thereof adapted to be inserted into said gases, a pair of through bores in said section, a dissimilar conductor concentric within each bore, said bores of larger diameter than said conductors, resilient insert means in said bores adjacent one end thereof for supporting said conductors out of contact with said bores, a fusible element joining one end of said conductors, stud means connected to the other end of said conductors and adapted to connect said conductors to an electrical circuit.

3. A probe for measuring the temperatures of jet engine gases comprising, a cylindrical ceramic section including one end of larger diameter and an end portion of lesser diameter for insertion in said gases, a pair of through longitudinal bores in said section, a dissimilar conductor of smaller diameter than said bores concentric within each bore, a resinous vibration absorbent support for said conductors in each bore adjacent one end thereof and concentric about said conductors, a fusible element joining said conductors at one end, a pair of terminals securing said conductors at the opposite end, and means for securing said section to said engine.

4. In a thermocouple for measuring the temperature of substantially high temperature gases wherein a pair of dissimilar conductors inside a ceramic section are inserted into the fluid under measurement, the improvement comprising, a pair of through bores in said section of larger diameter than said conductors, a resinous vibration absorbent support for said conductors positioned at one end of said bores, said support maintaining said conductors in spaced relation to and clear of the walls of said bores.

5. In a thermocouple for measuring the temperature of substantially high temperature gases, in combination, an elongated ceramic section directly in contact with said gases, a pair of dissimilar conductors joined at one end, a bore about each of said conductors of larger diameter than said conductors, and a vibration resistant support in said bores adjacent one end thereof for keeping said conductors clear of the walls of said bores, and means for securing said section in contact with said gases.

WILLIAM E. BRANDAU.

REFERENCES CITED

The following references are of record in the file of this patent:

UNITED STATES PATENTS

| Number | Name | Date |
|--------|------|------|
| 935,154 | Hopkins | Sept. 28, 1909 |
| 2,361,215 | Lamberger et al. | Oct. 24, 1944 |
| 2,504,764 | Volrath | Apr. 18, 1950 |
| 2,525,439 | Abbott | Oct. 10, 1950 |